United States Patent
Oddie

(10) Patent No.: US 9,366,559 B2
(45) Date of Patent: Jun. 14, 2016

(54) CORIOLIS FLOW METER

(71) Applicant: Schlumberger Technology Corporation, Sugar land, TX (US)

(72) Inventor: Gary Martin Oddie, St. Neots (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 31 days.

(21) Appl. No.: 14/197,585

(22) Filed: Mar. 5, 2014

(65) Prior Publication Data

US 2014/0251026 A1    Sep. 11, 2014

Related U.S. Application Data

(60) Provisional application No. 61/773,667, filed on Mar. 6, 2013.

(51) Int. Cl.
*G01F 1/84*    (2006.01)
*G01F 1/74*    (2006.01)

(52) U.S. Cl.
CPC ............. *G01F 1/8468* (2013.01); *G01F 1/74* (2013.01); *G01F 1/8436* (2013.01)

(58) Field of Classification Search
CPC ................................... G01F 1/84; G01F 7/00
USPC .................. 73/861.355–861.357; 702/48
See application file for complete search history.

(56) References Cited

U.S. PATENT DOCUMENTS

2008/0053240 A1    3/2008  Henry et al.
2010/0299089 A1*  11/2010  Stack et al. ............. 702/48
2014/0090484 A1*   4/2014  Henry et al. ........ 73/861.356

FOREIGN PATENT DOCUMENTS

| CA | 2559701 | 10/2005 |
|----|---------|---------|
| WO | 96/05484 | 2/1996 |
| WO | 98/31990 | 7/1998 |

OTHER PUBLICATIONS

Expanded search report for the equivalent European patent application No. 14000783.2 issued on May 28, 2014.
Roger.C. Baker, "Flow measurement handbook: Industrial Designs, Operating Principles, Performance and Applications—Coriolis Flowmeters," Chapter 17, Cambridge University Press, 2000, pp. 398-426.
G.M. Oddie and J.R.A. Pearson, "Flow rate measurement in two phase flow," Annual Review of Fluid Mechanics vol. 36, pp. 149-172.
"Mass flow meter," from Wikipedia at http://en.wikipedia.org/wiki/Mass_flow_meter.

* cited by examiner

*Primary Examiner* — Jewel V Thompson
(74) *Attorney, Agent, or Firm* — Cameron R. Sneddon

(57) ABSTRACT

A Coriolis flow meter for measuring a liquid volume fraction of a multiphase flow. The Coriolis meter includes a vibrating measurement conduit through which the multiphase flow, a wet gas flow or the like, is flowed and measured and/or analyzed. Operation of the Coriolis flow meter includes obtaining a measure of the input energy required to vibrate the conduit and a measure of the vibrational energy of the conduit, and determining the liquid volume fraction of the wet gas flow from the input energy and the vibrational energy. The liquid volume fraction may be used to correct other measurements made by the Coriolis flow meter such as density or mass flow rate.

10 Claims, 12 Drawing Sheets

| LVF | $A_{1M}$ | $A_{2M}$ |
|---|---|---|
| <=1 | 1100 | -15 |
| 2 | 1100 | -21 |
| 5 | 1100 | -30 |
| 10 | 1100 | -39 |

Fig. 6

| LVF (%) | $B_{1M}$ (kg/hr) |
|---|---|
| 0.00 | 0 |
| 0.10 | -40000 |
| 0.15 | -50000 |
| 0.20 | -60000 |
| 0.25 | -65000 |
| 0.35 | -75000 |
| 0.50 | -90000 |
| 1.00 | -120000 |

Fig. 9

| Parameter | Range of LVF | Before Correction | | After Correction | |
|---|---|---|---|---|---|
| | | Error | $R^2$ | Error | $R^2$ |
| Density | 0.00 – 10.0 | +40, -30% | 0.847 | ±10% | 0.9908 |
| Mass Flow Rate | 0.00 – 1.00 | +0, -30% | 0.9978 | ±5% | 0.999 |
| | 0.00 – 10.0 | +0, -30% | 0.9684 | +15, -20% | 0.9801 |

Fig. 12

CORIOLIS FLOW METER

CROSS-REFERENCE TO RELATED APPLICATIONS

This application claims the benefit of U.S. Provisional Application Ser. No. 61/773,667, filed Mar. 6, 2013, which is herein incorporated by reference.

BACKGROUND

Embodiments of the present disclosure relates to the operation of Coriolis flow meters, and in particular, but not by way of limitation, to the determination of the liquid volume fraction of a wet gas flow using such meters.

DESCRIPTION OF THE RELATED ART

The design and performance of Coriolis flow meters is well documented (see, e.g., R. C. Baker (2000), Flow measurement handbook, Industrial designs, operating principles, performance and applications (Chapter 17), Cambridge, pp 398-426).

Coriolis flow meters are used to measure fluid density and fluid mass flow rate, for example in relation to flows such as liquid/liquid emulsions, slurries and to some degree gas/liquid mixtures. A schematic of a typical twin tube or twin conduit Coriolis flow meter is shown in FIG. 1.

However, other classes of Coriolis flow meters exist and work in a similar manner, as shown in, e.g., FIG. 10 of G. M. Oddie and J. R. A. Pearson (2004), Flow rate measurement in two phase flow, Annual Review of Fluid Mechanics Vol. 36: 149-172. For example, it is not essential that two conduits are required for fluid flow; other examples of Coriolis flow meters include a convoluted single tube Coriolis flow meter, a straight tube Coriolis flow meter or a rotating element Coriolis flow meter.

The Coriolis flow meter of FIG. 1 works in the following way. A fluid flow 1 is directed into a conduit 3a which splits into two equal sized and parallel U-shaped conduits 5. Fluid flow passes through the parallel conduits 5 before returning to a single conduit 3b. The conduits 5 are vibrated in opposite directions by a drive (not shown). The counter-vibration of the conduits 5 allows the meter to compensate for external vibrations. A vibration sensor 11 measures the overall drive frequency ω of the system, whereas the vibration sensors 7 and 9 determine a vibrational phase shift τ.

When no fluid is flowing, the vibration of each conduit 5 is symmetrical as detected by sensors 7 and 9. For single phase flows, the conduits 5 are vibrated close to resonance, and the gain G of the power supply to the drive driving the vibrating motion is adjusted until the motion of the vibrating conduits 5 is at some predetermined level, defined for example by the amplitude (which is related to the pickup signal $V_R$). When fluid flows in the conduits 5, the vibrations of the inlet and outlet arms of each conduit become out of sync. In other words, the two arms of each conduit 5 are shifted out of phase with respect to each other, and the degree of phase-shift is related to the amount of mass that is flowing through the conduits 5. This phase shift τ is detected by the difference between the outputs from the two sensors 7 and 9. As shown in FIG. 1, the phase shift τ and the drive frequency ω of the system are processed by a computer to provide/determine values for the mass flow rate and fluid density, respectively.

Existing Coriolis flow meters tend to exhibit poor performance at low flow rates when the flowing medium is very "lossy," for example as in bubbly or mist flows typical of two phase flows with large density contrasts (see, e.g., G. M. Oddie and J. R. A. Pearson (2004), *Flow rate measurement in two phase flow*, Annual Review of Fluid Mechanics Vol. 36: 149-172).

As the dynamics of the vibrating flow meter conduits 5 become lossy due to temporal variations in mass flow rate, density or increased dissipation within the flow, the gain G has to be increased to maintain the vibration amplitude. With increasing dissipation, eventually the gain G saturates and further increases in dissipation results in a reduction in the vibrating amplitude. At some point the resonance is los, the flow meter fails to lock onto a resonant frequency and the flow meter fails.

However, being able to properly characterize multi-phase flows is desirable, particularly in the oil and gas industry.

SUMMARY

One embodiment of the present disclosure provides a method of operating a Coriolis flow meter having a vibrating measurement conduit through which a wet gas flow is being conveyed, the method including: obtaining a measure/determining the energy required to vibrate the conduit, obtaining a measure/determining the vibrational energy of the vibrating conduit, and using the input energy and the vibrational energy to determine a liquid volume fraction of the wet gas flow.

In one embodiment, the method provides for the determination of the amount of liquid carryover in extracted gases, for example. The present inventors have discovered a relationship between the liquid volume fraction ("LVF") of a wet gas flow and the amount of liquid in that flow. This relationship allows a correction to the flow meter (for example a correction to the measurements of mass flow rate and fluid density), that among other things provides a significant improvement to the flow meter accuracy and extends the operating envelope of the meter. Merely by way of example, in certain aspects of the present disclosure, flow meter accuracy can be improved, in particular, for wet gas flows having LVFs of the order of less than 10%.

In some embodiments, the wet gas conveyed through/by the Coriolis flow meter may be wet gas that is extracted directly from a hydrocarbon well. The wet gas may also be the unintended carryover from a gas liquid separation process that is working imperfectly. Alternatively, the wet gas may comprise steam, and the method may further include the step of injecting the steam into an oil deposit to assist in the extraction of oil from the deposit. It can be particularly beneficial for the control of such injection operations to properly characterize the injected steam flow. In other aspects, the wet gas being investigated may be in a technical field unrelated to the hydrocarbon industry.

In one embodiment of the present disclosure, a Coriolis flow meter is provided that comprises: a measurement conduit that is configured to be vibrated and through which a wet gas flow that is to analyzed is flowed, a system/device for measuring the input energy required to vibrate the conduit, a system/device capable of measuring/determining the vibrational energy of the conduit, the vibrational energy of the conduit as the wet gas flow flows through the conduit, and a computer, processor, software and/or the like that determines/processes the liquid volume fraction of the wet gas flow from the input energy and the vibrational energy.

The flow meter may further have a memory which stores the LVF. The memory may be accessed by the computer for calculations involving the LVF. The flow meter may further have a display which displays the LVF.

Further aspects of the present disclosure provide that the computer/processor may comprise, use, store a computer program comprising code which, when run on a computer, causes the computer to perform the method for determining the LVF, as described above. For example, the computer program may comprise code which, when run on a computer, causes the computer to determine a liquid volume fraction of a wet gas flow from a measure of an input energy required to vibrate a conduit and a measure of the vibrational energy of the conduit, the conduit being a vibrating measurement conduit of a Coriolis flow meter which, in use, conveys a wet gas flow.

Optional features of embodiments of the present disclosure will now be set out. These features are applicable singly or in any combination with any aspect of the disclosure as described in the application herein.

In some embodiments, the LVF may be determined from the ratio of the input energy of the vibrating conduit to the vibrational energy of the vibrating conduit.

In some embodiments, the input energy of the Coriolis flow meter may be provided by a power supply to a drive which vibrates the conduit. In some embodiments, the measure of the input energy may be the gain G of the power supply of the drive, which vibrates the conduit. In some embodiments, the measure of the vibrational energy may be the square of the amplitude of vibration of the conduit.

In some embodiments, the Coriolis flow meter may comprise a single vibrating conduit, for example as in a convoluted single tube Coriolis flow meter, a straight tube Coriolis flow meter or a rotating element Coriolis flow meter. In other embodiments, the Coriolis flow meter may comprise a plurality of vibrating conduits. In embodiments comprising two vibrating conduits, the second conduit may comprise substantially the same dimensions as the first vibrating conduit. In some embodiments, the second conduit may be parallel to the first conduit. In some embodiments, the two conduits may be driven so that they counter-vibrate. In some embodiments, the LVF may be determined from the ratio of the input energy of the two vibrating conduits to the vibrational energy of the two vibrating conduits.

The present inventors have discovered that errors in a conventional Coriolis flow meter's measurements of both density and mass flow rate outputs can be a function of the LVF. Accordingly, in some embodiments of the present disclosure, the LVF may be used to correct density measurements obtained by the meter, and/or the LVF may be used to correct mass flow rate measurements obtained by the meter. The corrected measurement(s) may be displayed and/or stored in memory.

Additionally or alternatively, the LVF may be used for other purposes and in other calculations. For example, in some embodiments, the LVF may be used to correct density measurements and/or to correct mass flow rate measurements obtained by another Coriolis flow meter. Another option is to use the LVF to change the operating conditions of a separator to minimize liquid carryover.

In some embodiments, pressure and temperature of the wet gas flow may also be measured, e.g., by respective sensors. In some embodiments, in combination with corrected density measurements and/or mass flow rate measurements, it is possible to provide a full PVT analysis for a wet gas flow.

The Coriolis flow meter in accordance with embodiments of the present disclosure may be integrated into other systems involved in fluid flow analysis/measurement, and may, for example, form part of a drilling or production rig, or a processing or pumping plant.

BRIEF DESCRIPTION OF THE DRAWINGS

Embodiments of the disclosure will now be described by way of example with reference to the accompanying drawings in which:

FIG. 6 shows a table of fitting coefficients for density measurements;

FIG. 9 shows a table fitting coefficient $B_{1M}$ for mass flow rate measurements;

FIG. 12 shows a table summarising Coriolis meter performance before and after LVF-based correction, in accordance with an embodiment of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides some embodiments only, and is not intended to limit the scope, applicability or configuration of the disclosure. Rather, the ensuing description of some embodiment will provide those skilled in the art with an enabling description for implementing a desired embodiment of the disclosure, it being understood that various changes may be made in the function and arrangement of elements without departing from the scope of the disclosure.

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Figure 1:
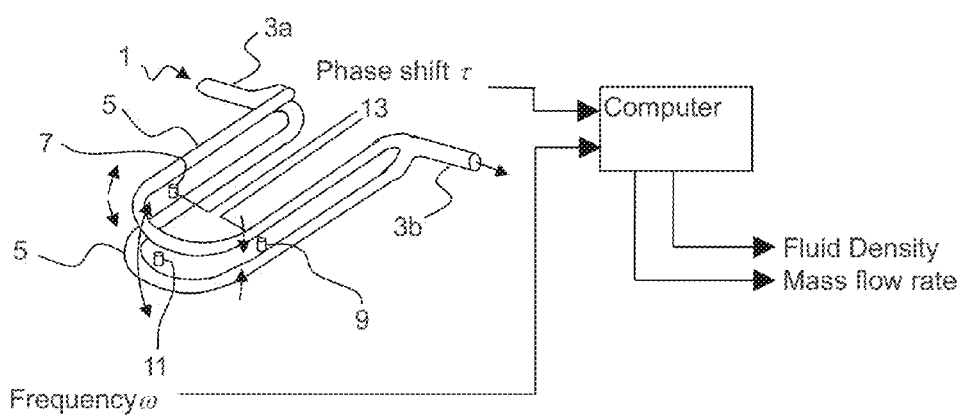
FIG. 1 shows a schematic of a conventional Coriolis flow meter.
Figure 2:
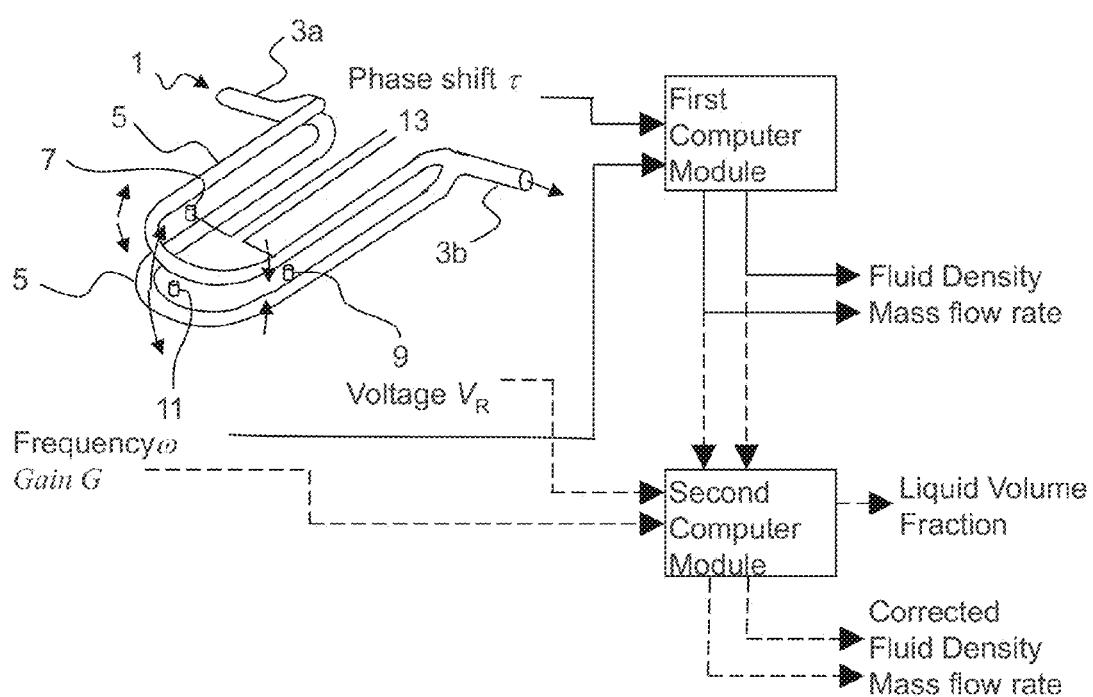
FIG. 2 shows a schematic of a Coriolis flow meter according to one embodiment of the present disclosure.

A Coriolis flow meter in accordance with one embodiment of the present disclosure is shown in FIG. 2. The Coriolis flow meter uses elements of the conventional Coriolis flow meter shown in FIG. 1. For example, in terms of fluid flow, driving of conduit vibration, and measurement of drive frequency ω and vibrational phase shift τ, the meter of FIG. 2 may be operated in the same way as the conventional meter. Accordingly the reference numbers used in FIG. 2 to indicate components of the meter which correspond to components of the conventional meter are the same as those used in FIG. 1.

However, the Coriolis flow meter of FIG. 2 also has built-in diagnostic systems. In some embodiments, one of these systems may provide an amplitude of the signal from the sensor 11 detecting the motion of the vibrating U-shaped conduits 5 (for example, in some aspects, the system may provide a voltage $V_R$, referred to as the pickup signal). In some embodiments, another system may provide the gain G of the power supply that is providing power to the drive/controller driving the vibrating motion of the conduits 5. The square of the vibration amplitude of the conduit is a measure of the vibrational energy of the conduits 5, and the gain G is a measure of the input energy required to vibrate the conduits 5. The vibrational energy can be measured using several non-contact methods such as, e.g., magnetic pickups, capacitive and optical distance sensors and/or the like. In some embodiments, the gain may be measured directly from the drive circuit for the Coriolis meter or indirectly by measures of, e.g., the current and voltage to the excitation coils or the magnetic field created by the excitation coil and/or the like.

In addition, the computer of the Coriolis flow meter of FIG. 2 may have extended analysis capability. In some embodiments, a first module of the computer may process the phase shift τ and drive frequency ω to provide conventional (uncorrected) values for the fluid density and mass flow rate. However, in some embodiments, a second module of the computer may process the gain G or the like and the pickup signal $V_R$ or the like to calculate the LVF. In some aspects, the processed LVF or an equivalent may be used to correct the fluid density and mass flow rate processed buy the Coriolis flow meter.

In some embodiments, an inefficiency factor I may be defined as follows:

$$I = 0.001 \frac{G}{V_R^2} \quad [1]$$

The factor can be considered as the ratio of the energy being supplied by the flow meter to maintain the flow meter vibration (proportional to the drive gain G) to the energy in the vibrating conduits (proportional to the square of the amplitude of vibration). Conveniently, G may be measured in % of maximum gain and $V_R$ in volts. However, the units and hence the scaling factor (here 0.001) are arbitrary.

Figure 3:
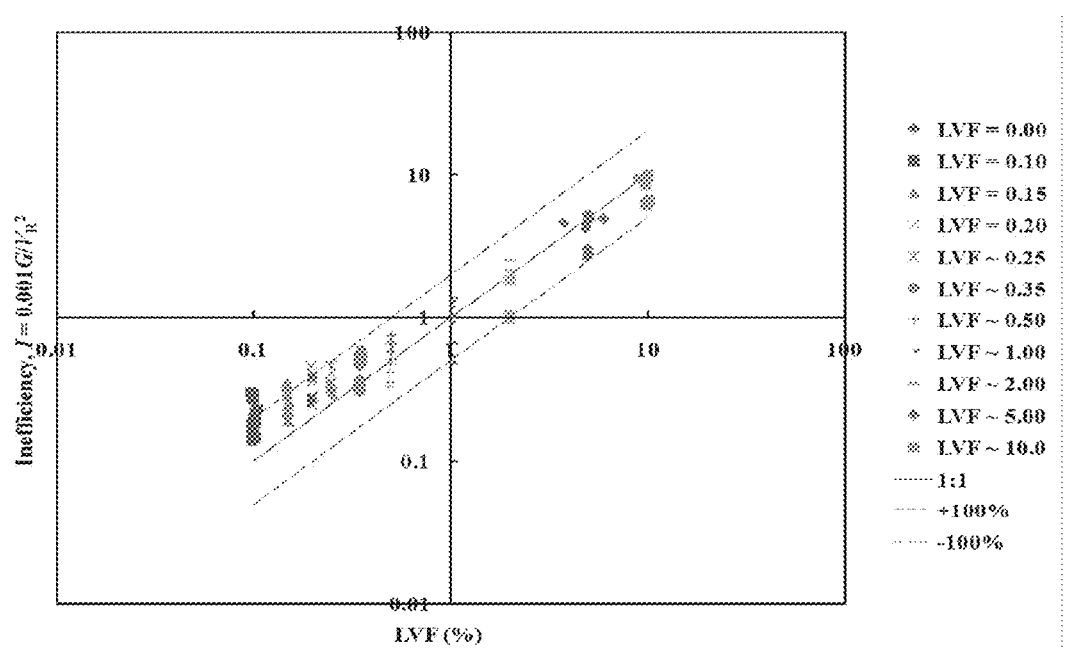
FIG. 3 shows a plot of inefficiency factor as a function of LVF.

A large number of tests at different LVFs demonstrate that the inefficiency factor is a simple function of the flowing liquid volume fraction, as illustrated by FIG. 3, which shows a log-log plot of the inefficiency factor against LVF.

In embodiments of the present disclosure, the plot of FIG. 3 may be inverted to allow a determination of the LVF from a measurement of G and $V_R$, whence:

$$LVF(\%) = 0.001 \frac{G}{V_R^2} \quad [2]$$

While this relation has been determined from a log-log plot and with some spread in the data (the $G/V_R^2$ values for each LVF in FIG. 3 vary by a factor of approximately 2), the tests in accordance with aspects of the present disclosure establish that a direct measurement of LVF may be obtained from $G/V_R^2$. A similar relation, but with a different scaling factor (which for purposes of the present disclosure may be experimentally determined or the like), will be applicable to other Coriolis flow meters when flowing wet gas.

Different sized Coriolis flow meters may be selected for different applications and according to the flow that is to be measured. Accordingly, the measurable range of values for e.g., the fluid density and mass flow rate of the wet gas flows may vary depending on the Coriolis flow meter selected. However, in embodiments of the present disclosure, the relationship between the input energy required to vibrate the conduit and the vibrational energy of the conduit, giving the LVF, can still hold even for very different meters and flow conditions. In addition, the use of the LVF value to correct density measurements and/or mass flow rate measurements is generally applicable.

In some embodiments, a second computer module may determine the LVF of the wet gas flow from the input energy and the vibrational energy. The Coriolis flow meter may further have a display for displaying the LVF (and optionally for displaying G and $V_R$) and a memory for storing the LVF. The memory may be accessed by the computer for further calculations using the LVF, or the LVF may be passed on to other systems or processors for further use.

Figure 4:
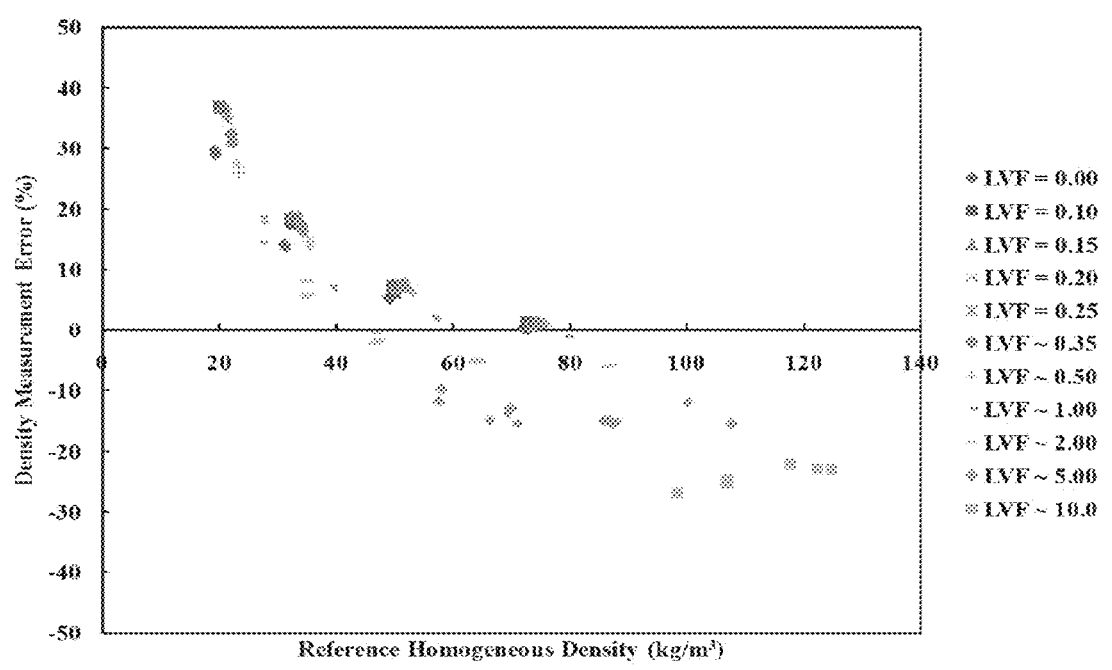
FIG. 4 shows a plot of the density measurement error in a conventional Coriolis flow meter.
Figure 5:
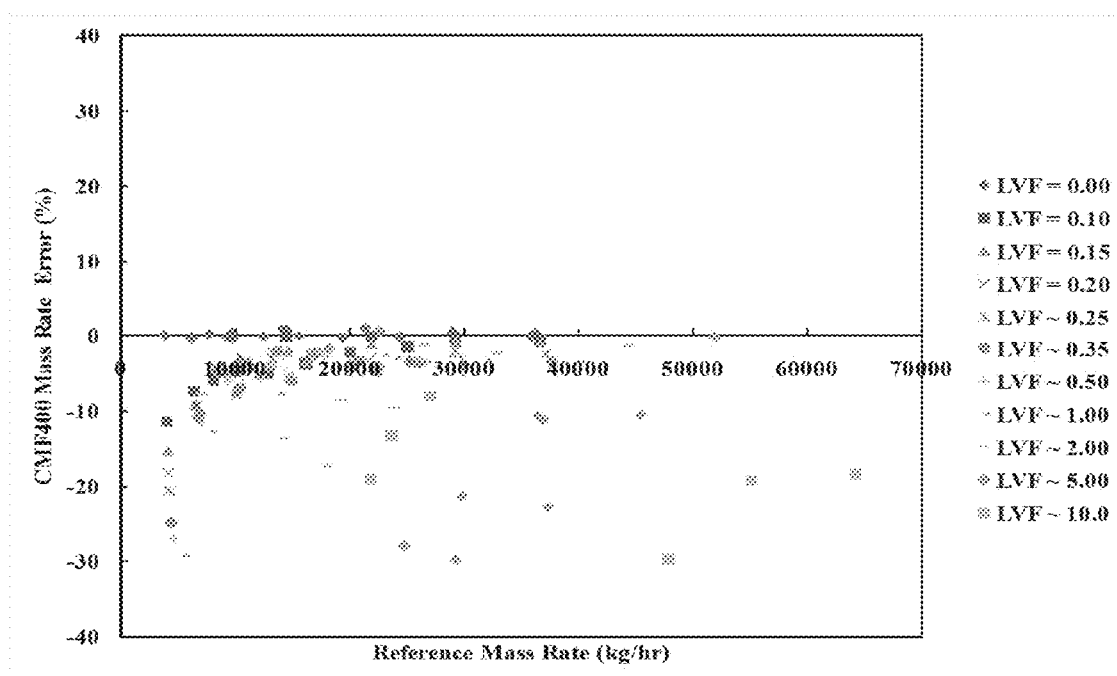
FIG. 5 shows a plot of the mass flow rate measurement error in a conventional Coriolis flow meter.

FIGS. 4 and 5 show respective plots of the density measurement error and the mass flow rate measurement error from a conventional Coriolis flow meter. An insight of the present inventors is that the measurement errors in density and mass flow rate are related to the LVF. For the density the error $\Delta\rho_{Meas}$ for a given density $\rho_{Meas}$ can be modelled as follows:

$$\Delta\rho_{Meas} = \frac{A_{1M}}{\rho_{Meas}} - A_{2M} \quad [3]$$

where the fitting coefficients $A_{1M}$ and $A_{2M}$ are determined from the experimental data. These coefficients are shown in FIG. 6 for different values of LVF. The coefficient $A_{1M}$ is constant and $A_{2M}$ is a function of LVF.

Figure 7:
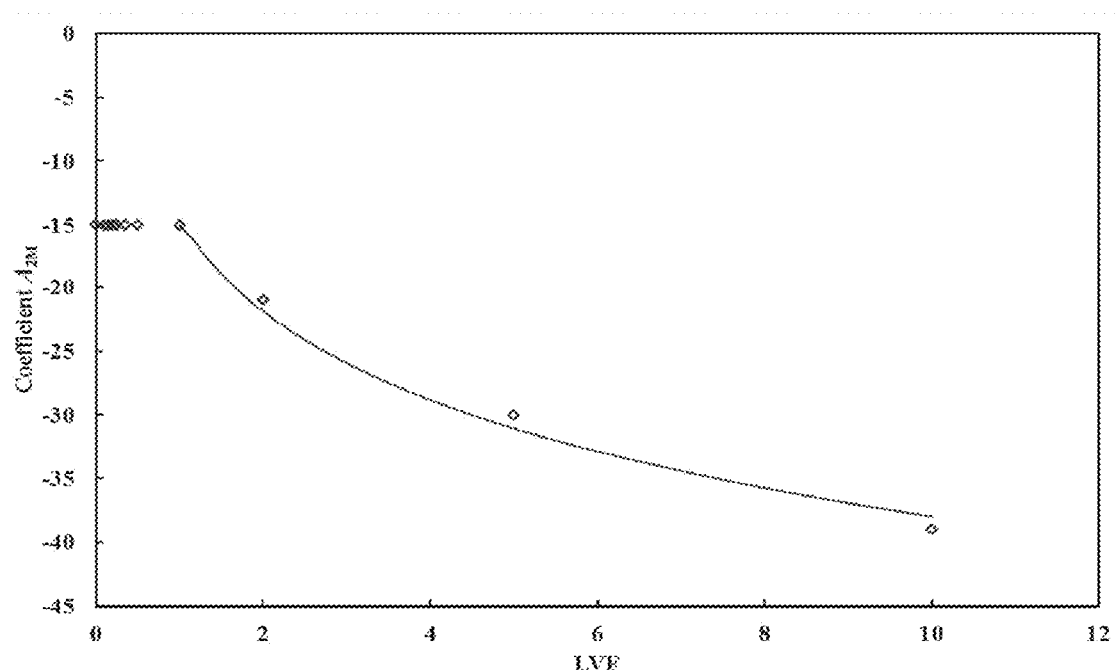
FIG. 7 shows a plot of fitting coefficient $A_{2M}$ as a function of LVF.

FIG. 7 shows a plot of $A_{2M}$ against LVF. It can be seen that $A_{2M}$ has two empirical solutions, the first for LVF≤1% where $A_{2M}=-15$, and the second for LVF>1% where:

$$A_{2M} = -15 - 10 \ln LVF \quad [4]$$

Thus in order to apply a correction to the measured density it is necessary to know the value of the LVF. As the LVF can be calculated using equation [2] above, this can readily be done.

Figure 8:
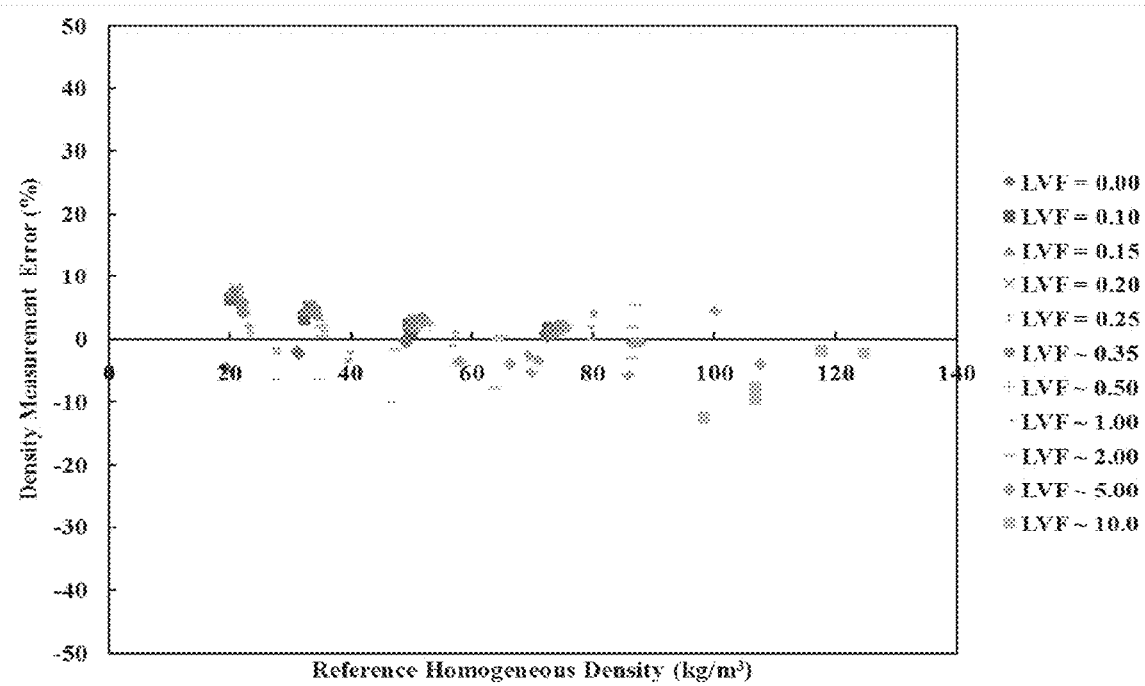
FIG. 8 shows a plot of density measurement error after correction using an LVF measurement, in accordance with an embodiment of the present disclosure.

Applying this correction to the measured density data of FIG. 4 provides the error plot shown by FIG. 8. As illustrated in the figure, the error in the density measurement has been reduced from a range of +40% to −30% with a strong dependency of error on density to a range of +10% to −10% with a low dependency on density.

In a similar manner, the error $\Delta\dot{M}_{Meas}$ in the mass flow rate measurement $\dot{M}_{Meas}$ can be modelled using the following equation:

$$\Delta\dot{M}_{Meas} = \frac{B_{1M}}{\dot{M}_{Meas}} \quad [5]$$

where the fitting coefficient $B_{1M}$ is determined from the experimental data as a function of LVF, as shown in the table of FIG. 9. There is no second coefficient (i.e., $B_{2M}$) as there is no error in the mass flow rate measurement when the LVF=0%.

Figure 10:
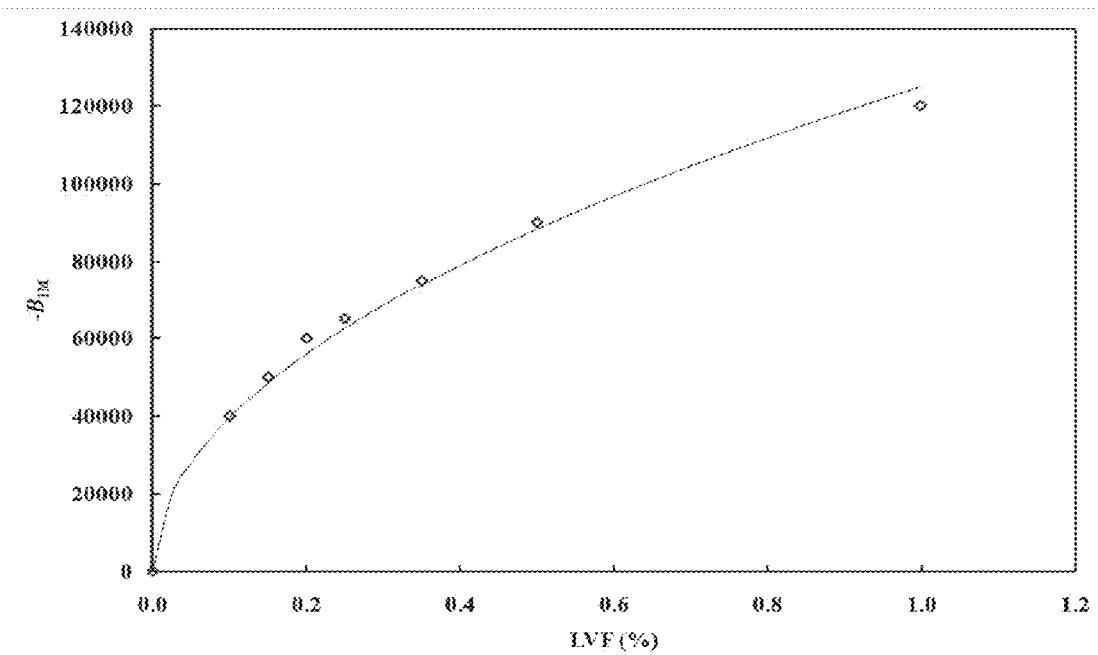
FIG. 10 shows a plot of fitting coefficient $B_{1M}$ as a function of LVF.

Plotting $-B_{1M}$ against LVF, as shown in FIG. 10, allows an empirical functionality to be determined:

$$B_{1M} = 125000 LVF^{0.5} \quad [6]$$

Thus, in accordance with an embodiment of the present disclosure, a correction to the mass flow rate measurement can be made using the value of LVF determined from G and $V_R$. Applying this correction to the mass flow rate measurement of FIG. 5 leads to the error plot shown in FIG. 11.

Figure 11:
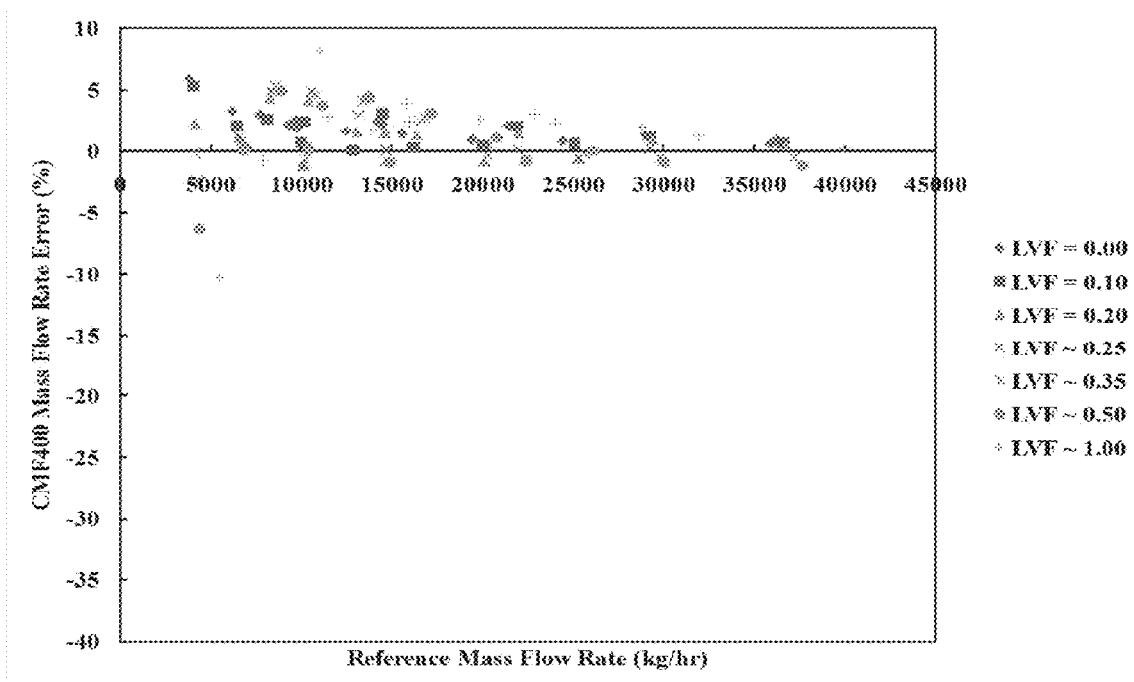
FIG. 11 shows a plot of mass flow rate measurement error after correction using LVF measurement, in accordance with an embodiment of the present disclosure.

Comparing FIGS. 5 and 11 it can be seen that the mass flow rate measurement error has been reduced from a range of +0% to −30% to a range of +5% to −5%.

The improved Coriolis flow meter outputs are summarized by FIG. 12.

Although the above mass flow rate and density measurements have, in accordance with an embodiment of the present disclosure, been corrected for a particular Coriolis flow meter, the same method can be applied to correct the mass flow rate and density measurements of other Coriolis flow meters. The Coriolis flow meter may have a display for displaying the corrected mass flow rate and density measurements and a memory for storing these measurements. The memory may be accessed by the computer for further calculations, or these measurements may be passed on to other systems or processors for further use.

In some embodiments, the Coriolis flow meter may further have a pressure sensor for measuring the pressure of the wet gas flow, and a temperature sensor for measuring the temperature of the wet gas flow. This may allow the Coriolis flow meter to perform pressure volume temperature (PVT) analysis "on the fly." Changes in the operating pressure, either naturally occurring due to process changes or created deliberately using flow restricting valves will change the equilibrium of a vapor/liquid system, potentially allowing the detection of parameters such as dew point, further allowing control of processes that require dry gas or defined LVFs.

In some aspects, the wet gas conveyed by the Coriolis flow meter may be extracted from a hydrocarbon well. In other aspects, the wet gas may also be a product of the carryover from a non-optimal gas-liquid separation system.

In further aspects, the wet gas may be steam for injection into an oil deposit to assist in the extraction of oil from the deposit. For example, the oil deposit may be tar sands. As the steam may be at temperatures of up to 300 or 400° C., the Coriolis flow meter can be correspondingly designed to withstand such temperatures. In yet further aspects, the wet gas flow may be in an industry other than the hydrocarbon industry, such as steam analysis in power stations and/or the like.

All references referred to above are hereby incorporated by reference for all purposes. While the principles of the disclosure have been described above in connection with specific apparatuses and methods, it is to be clearly understood that this description is made only by way of example and not as limitation on the scope of the disclosure.

The invention claimed is:

1. A method of operating a Coriolis flow meter comprising a vibrating measurement conduit configured to convey a wet gas flow, the method comprising:
   determining an input energy required to vibrate the conduit (power required to drive it at that frequency);
   determining vibrational energy of the vibrating conduit (amplitude of vibration); and
   determining a liquid volume fraction of the wet gas flow from the input energy and the vibrational energy, wherein the liquid volume fraction of the wet gas flow is determined from a ratio of the input energy to the vibrational energy.

2. The method of claim 1, wherein the input energy comprises a gain of a power supply of a drive that vibrates the conduit, G, wherein the vibrational energy comprises a square of an amplitude of vibration of the conduit, $V_R^2$, and wherein the ratio for determining the liquid volume fraction (LVF) is LVF=$G/V_R^2$.

3. The method of claim 1 further comprising:
   using the liquid volume fraction to correct at least one of density measurements and mass flow rate measurements obtained by the Coriolis flow meter.

4. The method of claim 1, further comprising:
   measuring at least one of a pressure and a temperature of the wet gas flow.

5. A Coriolis flow meter comprising:
   a vibratable measurement conduit configured, in use, to convey a wet gas flow;
   a first system configured to measure an input energy required to vibrate the conduit;
   a second system configured to measure vibrational energy of the conduit; and
   a processor configured to determine a liquid volume fraction of the wet gas flow from the input energy and the vibrational energy, wherein the liquid volume fraction of the wet gas flow is determined from a ratio of the input energy to the vibrational energy.

6. The Coriolis flow meter of claim 5, wherein the input energy comprises a gain of a power supply of a drive that vibrates the conduit, G, wherein the vibrational energy comprises a square of an amplitude of vibration of the conduit, $V_R^2$, and wherein the ratio for determining the liquid volume fraction (LVF) is LVF=$G/V_R^2$.

7. The Coriolis flow meter of claim 5, wherein the processor is configured to determine at least one of corrected density measurements and corrected mass flow rate measurements from the liquid volume fraction.

8. The Coriolis flow meter of claim 5, further comprising:
a drive system coupled with the conduit and configured to vibrate the conduit;
a power supply coupled with the drive and configured to provide power to the drive, wherein the first system is configured to measure a gain of the power supply.

9. The Coriolis flow meter of claim 5, wherein the second system measures an amplitude of vibration of the conduit.

10. The Coriolis flow meter of claim 5, further comprising:
at least one of a pressure sensor for measuring a pressure of the wet gas flow and a temperature sensor for measuring a temperature of the wet gas flow.

\* \* \* \* \*